April 12, 1960   H. WINTER ET AL   2,932,505
MOTOR VEHICLE WHEEL SUSPENSION
Filed July 30, 1958
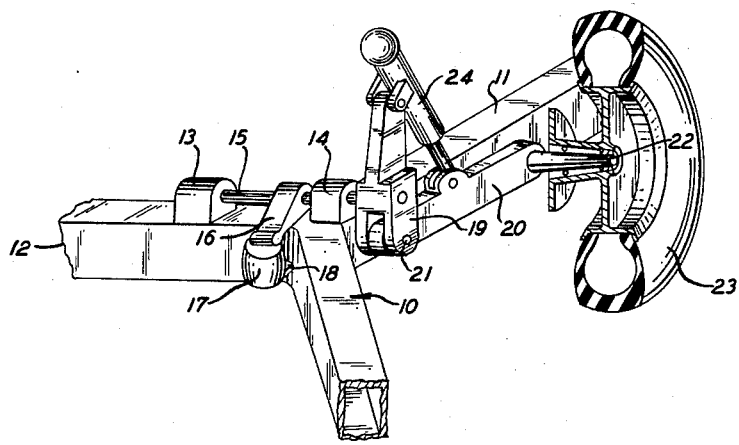
HORST WINTER
GERD LECH
INVENTORS
BY E. C. McRae
J. R. Faulkner
J. H. Oster
ATTORNEYS United States Patent Office 2,932,505
Patented Apr. 12, 1960

2,932,505
MOTOR VEHICLE WHEEL SUSPENSION

Horst Winter, Darmstadt, and Gerd Lech, Hannover, Germany, assignors to Ford Motor Company, Dearborn, Mich., a corporation of Delaware Application July 30, 1958, Serial No. 752,095

1 Claim. (Cl. 267—15)

This invention relates to a wheel suspension for a motor vehicle and particularly to a suspension in which the wheel is supported for both vertical and longitudinal movement relative to the vehicle frame.

It is an object of the present invention to provide a motor vehicle wheel suspension in which the wheel is mounted for vertical movement to absorb vertical shocks and is also mounted for limited movement in a longitudinal direction to absorb longitudinal shocks. A further object of the invention is to provide a wheel suspension in which the wheel is spring suspended both vertically and longitudinally and in which harshness is minimized.

Other objects and advantages of this invention will be made more apparent as this description proceeds, particularly in connection with the accompanying drawing, in which the single view is a fragmentary perspective view of a motor vehicle incorporating the wheel suspension of the present invention.

Referring now to the drawing, the reference character 10 indicates generally a vehicle frame having a longitudinally extending side frame member 11 and a cross frame member 12. A pair of transversely spaced bearings 13 and 14 are mounted upon the cross frame member 12 and rotatably support a transversely extending pivot shaft 15. A lever arm 16 is secured to the pivot shaft 15 between the bearings 13 and 14 and extends forwardly therefrom. A hollow rubber spring 17 is mounted between the end of the lever arm 16 and a bracket 18 secured to the cross frame member 12 and resiliently resists rotation of the pivot shaft 15.

The pivot shaft 15 extends outwardly beyond the bearing 14 and has secured thereto a generally vertically extending suspension member 19. The lower end of the member 19 is formed as a clevis, and pivotally supports a generally longitudinally extending suspension arm 20 for pivotal movement about a transversely extending pivotal axis 21. A wheel spindle 22 is carried at the rearward end of the suspension arm 20 and conventionally rotatably supports a road wheel 23.

A telescopic spring strut 24 is provided and is connected adjacent its opposite ends to an intermediate part of the suspension arm 20 and the upper end of the suspension member 19. The strut forms resilient spring means for supporting the vertical load upon the vehicle and for cushioning relative vertical movement between the road wheel and the frame. As shown it comprises an air cylinder but it may also enclose a coil spring and a hydraulic shock absorber.

In addition to cushioning vertical wheel movement, the suspension also permits a limited longitudinal movement or recession of the road wheel by reason of the pivotal mounting of the vertical suspension member 19. This relative movement between the road wheel and the vehicle frame in a longitudinal direction is cushioned by the spring member 17 and results in a suspension cushioning road shocks and minimizing harshness.

The invention is illustrated in the drawing as applied to a nondriven rear wheel of a vehicle of the front drive type, but it may also be applied to road wheels of other types of vehicles as well. The drawing also illustrates a rubber spring member 17 for resisting longitudinal movement of the suspension arm 20 and road wheel 23. This function may be performed by other spring means as well, and might, for example, take the form of an anchored pivot shaft 15 functioning as a torsion bar.

It will be understood that the invention is not to be limited to the exact construction shown and described, but that various changes and modifications may be made without departing from the spirit and scope of the invention, as defined in the appended claim.

What is claimed is:

In a wheel suspension for a motor vehicle having a frame and a road wheel, a substantially vertical support arm mounted upon said frame for pivotal movement relative thereto about a generally transverse first axis, resilient means acting upon said support arm and resisting such movement, a generally longitudinally extending suspension arm pivotally connected to said support arm for swinging movement about a generally transversely extending second axis vertically offset in one direction from said first axis, journalling means on said suspension arm rotatably supporting said road wheel, said means being longitudinally spaced from said second pivotal axis, and spring means for said road wheel acting upon said suspension arm, said spring means being connected between a point on said suspension arm intermediate between said second axis and said journalling means, and a point on said support arm vertically offset in the other direction from said first axis.

References Cited in the file of this patent

UNITED STATES PATENTS

| 1,171,942 | Goodwin | Feb. 15, 1916 |
| 1,178,639 | Guest | Apr. 11, 1916 |

FOREIGN PATENTS

| 1,133,596 | France | Nov. 19, 1956 |